United States Patent
Olinger et al.

(10) Patent No.: US 8,761,987 B2
(45) Date of Patent: Jun. 24, 2014

(54) AUTOMATIC GUIDED VEHICLE SENSOR SYSTEM AND METHOD OF USING SAME

(75) Inventors: Michael D. Olinger, Kentwood, MI (US); Joseph G. Mickley, Kentwood, MI (US)

(73) Assignee: Checkpoint LLC, Kentwood, MI (US)

( * ) Notice: Subject to any disclaimer, the term of this patent is extended or adjusted under 35 U.S.C. 154(b) by 156 days.

(21) Appl. No.: 13/253,679

(22) Filed: Oct. 5, 2011

(65) Prior Publication Data

US 2012/0330491 A1   Dec. 27, 2012

Related U.S. Application Data

(60) Provisional application No. 61/389,830, filed on Oct. 5, 2010.

(51) Int. Cl.
| | | |
|---|---|---|
| G05D 1/02 | (2006.01) | |
| B62D 1/24 | (2006.01) | |
| G01B 7/14 | (2006.01) | |

(52) U.S. Cl.
USPC .................. 701/23; 180/168; 324/207.22

(58) Field of Classification Search
None
See application file for complete search history.

(56) References Cited

U.S. PATENT DOCUMENTS

| | | | | |
|---|---|---|---|---|
| 5,187,664 A | * | 2/1993 | Yardley et al. ................... | 701/23 |
| 5,191,528 A | * | 3/1993 | Yardley et al. ................... | 701/23 |
| 5,764,014 A | * | 6/1998 | Jakeway et al. ................ | 318/587 |
| 6,150,809 A | * | 11/2000 | Tiernan et al. ................. | 324/238 |
| 6,256,560 B1 | * | 7/2001 | Kim et al. ........................ | 701/23 |
| 6,272,406 B2 | * | 8/2001 | Alofs et al. ...................... | 701/24 |
| 6,345,217 B1 | * | 2/2002 | Zeitler et al. .................... | 701/23 |
| 6,502,031 B2 | * | 12/2002 | Uehara .......................... | 701/518 |
| 6,721,638 B2 | * | 4/2004 | Zeitler ............................ | 701/23 |
| 6,882,910 B2 | * | 4/2005 | Jeong ............................. | 701/23 |
| 2002/0165648 A1 | * | 11/2002 | Zeitler ............................ | 701/23 |
| 2003/0029345 A1 | * | 2/2003 | Tiernan et al. ................. | 102/221 |
| 2003/0106731 A1 | * | 6/2003 | Marino et al. ................. | 180/168 |
| 2004/0074685 A1 | * | 4/2004 | Tham ............................ | 180/168 |
| 2004/0244625 A1 | * | 12/2004 | Tiernan et al. ................. | 102/221 |
| 2004/0245997 A1 | * | 12/2004 | Plotnikov et al. ............. | 324/529 |
| 2004/0263163 A1 | * | 12/2004 | Baragatti et al. .............. | 324/252 |
| 2005/0246078 A1 | * | 11/2005 | Vercammen ..................... | 701/23 |
| 2005/0270022 A1 | * | 12/2005 | Siegle et al. ................... | 324/252 |
| 2006/0009923 A1 | * | 1/2006 | Shay et al. ....................... | 702/38 |
| 2006/0290340 A1 | * | 12/2006 | Shapiro ..................... | 324/117 H |
| 2007/0179690 A1 | * | 8/2007 | Stewart ............................ | 701/23 |

(Continued)

FOREIGN PATENT DOCUMENTS

JP    2008305395    12/2008

*Primary Examiner* — Fadey Jabr
*Assistant Examiner* — Krishnan Ramesh
(74) *Attorney, Agent, or Firm* — Price Heneveld LLP (57) ABSTRACT

An automatic guided vehicle (AGV) system for automatically transporting loads along a predetermined path is provided that includes a plurality of magnets distant from one another, wherein at least a portion of the plurality of magnets represent a positioning point, and a plurality of AGVs, wherein at least one of the plurality of AGVs includes a drive assembly and a sensor system configured to determine guidance information. The sensor system includes a circuit board, a two-dimensional array of giant magneto resistive (GMR) sensors along a surface of the circuit board, the GMR sensors configured to detect at least one of the plurality of embedded magnets when the GMR sensors are proximate thereto, and an electromagnetic coil extending around the circuit board and at least a portion of the GMR sensors, the electromagnetic coil configured to polarize the GMR sensors.

24 Claims, 4 Drawing Sheets

(56) References Cited

U.S. PATENT DOCUMENTS

| | | | |
|---|---|---|---|
| 2007/0269299 A1* | 11/2007 | Ross et al. | 414/347 |
| 2009/0128139 A1* | 5/2009 | Drenth et al. | 324/207.22 |
| 2009/0252577 A1* | 10/2009 | Tuffs et al. | 414/222.01 |
| 2009/0289694 A1* | 11/2009 | Rieger et al. | 327/524 |
| 2009/0309588 A1* | 12/2009 | Nieuwenhuis et al. | 324/232 |
| 2010/0072992 A1* | 3/2010 | Bauer | 324/260 |
| 2010/0138095 A1* | 6/2010 | Redmann et al. | 701/24 |
| 2012/0197477 A1* | 8/2012 | Colwell | 701/25 |
| 2012/0303190 A1* | 11/2012 | Pfeiffer | 701/22 |
| 2012/0330491 A1* | 12/2012 | Olinger et al. | 701/23 |

* cited by examiner

AUTOMATIC GUIDED VEHICLE SENSOR SYSTEM AND METHOD OF USING SAME

CROSS REFERENCE TO RELATED APPLICATIONS

This application claims priority under 35 U.S.C. §119(e) to U.S. Provisional Patent Application No. 61/389,830, filed Oct. 5, 2010, entitled "AUTOMATIC GUIDED VEHICLE SYSTEM SENSOR SYSTEM AND METHOD THEREOF", which is herein incorporated by reference in its entirety.

FIELD OF THE INVENTION

The present invention is generally directed towards a sensor system and method thereof, and more particularly, to an automatic guided vehicle system having a sensor system for positioning the AGV proximate a positioning point and method thereof.

BACKGROUND OF THE INVENTION

Generally, automatically guided vehicles (AGV) are used in large warehouses, factories, and/or shipyards in order to move or transport loads along predetermined paths. Since the AGVs transport loads along a predetermined path, each AGV does not require an operator to control or drive the AGV. Instead, AGVs generally transport the loads along the predetermined paths based upon a series of commands or signals received from a system controller. One exemplary AGV method and apparatus is disclosed in U.S. Pat. No. 6,721,638, entitled "AGV POSITION AND HEADING CONTROLLER," the entire disclosure being hereby incorporated herein by reference. Typically, the AGVs are powered by a battery on-board the AGV to travel along the predetermined paths, and are not electrically connected to a system power source during normal AGV operation.

The predetermined path can be a series of rails (e.g., tracks) that require the AGV to travel along a particular path. Alternatively, a series of position markers that are detected by the AGV can be used to control the travel path of the ATV. Yet another alternative is a master controller that monitors the location of the AGVs and communicates navigational instructions to such AGV.

In certain AGV applications the AGVs load must be positioned accurately at the predetermined path termination including but not limited to positioning large assemblies at robotic stations during automated manufacturing processes. Accordingly, it is desirable for many applications that the AGV be positioned at a positioning point in an accurate manner so as to derive the most utility from the device.

SUMMARY OF THE PRESENT INVENTION

According to one aspect of the present invention, an automatic guided vehicle (AGV) system for automatically transporting loads along a predetermined path is provided. The system includes a plurality of embedded magnets distant from one another, wherein at least a portion of the plurality of magnets represent a positioning point, and a plurality of AGVs, wherein at least one of the plurality of AGVs includes a drive assembly and a sensor system configured to determine guidance information. The sensor system includes at least one circuit board, a two-dimensional array of giant magneto resistive (GMR) sensors along a surface of the circuit board, the GMR sensors configured to detect at least one of the plurality of embedded magnets when the GMR sensors are proximate thereto, and an electromagnetic coil extending around the circuit board and at least a portion of the GMR sensors, the electromagnetic coil configured to polarize the residual magnetic field in the GMR sensors. The plurality of AGVs further includes a controller in communication with the sensor system, wherein the controller is configured to control the drive assembly based upon the determined guidance information, such that the controller controls the drive assembly to maintain the AGV within approximately less than one (1) inch of the predetermined path.

According to another aspect of the invention, a sensor system is configured to determine guidance information for positioning an automatic guided vehicle (AGV) within approximately less than one eighth (⅛) of an inch of a positioning point that includes at least partially an embedded magnet is provided. The system includes a circuit board, a two-dimensional array of giant magneto resistive (GMR) sensors along a surface of the circuit board, wherein the GMR sensors are configured to detect the embedded magnet when the GMR sensors are proximate thereto, and an electromagnetic coil extending around the circuit board and at least a portion of the GMR sensors, the electromagnetic coil configured to polarize the residual magnetic field in the GMR sensors.

According to yet another aspect of the present invention, a method of positioning an automatic guided vehicle (AGV) having a drive assembly proximate a positioning point that includes an embedded magnet is provided. The method includes the steps of polarizing a plurality of GMR sensors, detecting a magnetic field of the embedded magnet by at least one of the polarized plurality of GMR sensors, determining guidance information in approximately real-time, and communicating the guidance information to control the drive assembly to position the AGV within approximately less than one eighth (⅛) of an inch of the positioning point.

These and other aspects, objects, and features of the present invention will be understood and appreciated by those skilled in the art upon studying the following specification, claims, and appended drawings.

BRIEF DESCRIPTION OF DRAWINGS

The present invention will now be described, by way of example, with reference to the accompanying drawings, in which.

DETAILED DESCRIPTION OF PREFERRED EMBODIMENTS

For purposes of description herein, the terms "upper", "lower", "right", "left", "rear", "front", "vertical", "horizontal" and derivatives thereof shall relate to the invention as oriented during normal operation. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
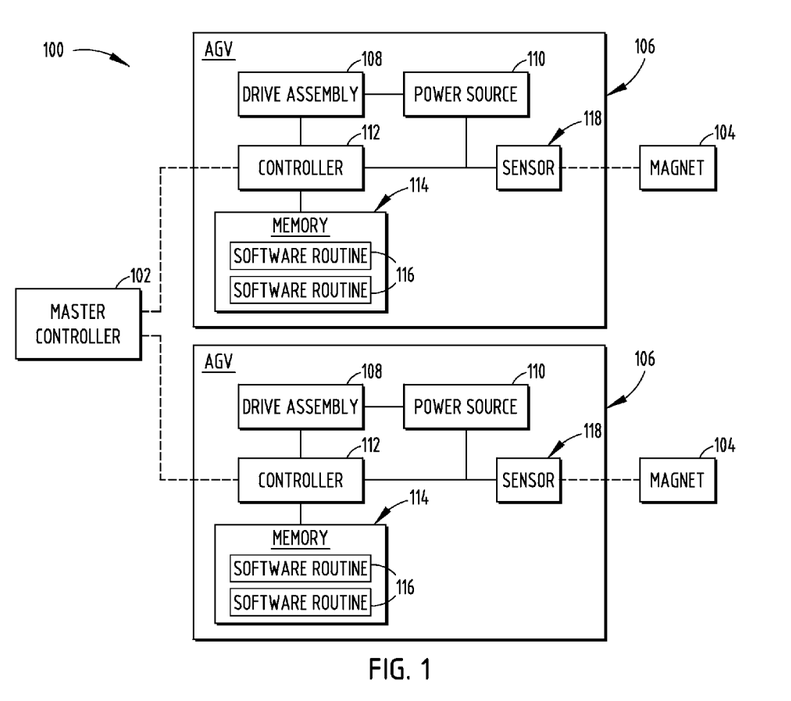
FIG. 1 is a block diagram of an automatic guided vehicle system, in accordance with an embodiment of the present invention.

With regard to FIG. 1, an automatic guided vehicle (AGV) system is generally shown at reference identifier 100, wherein the AGV systen 100 is typically used for automatically transporting loads along a predetermined path. The AGV systen 100 can include a master controller 102, a magnet 104 that can be at least partially embedded into a floor, and a plurality of self-propelled AGVs generally indicated at 106. Exemplary AGVs that can be utilized in the AGV systen 100 are disclosed in U.S. Patent Application Publication No. 2009/0252577 entitled "AUTOMATED AGV TRAILER LOADER/UNLOADER AND METHOD," and U.S. Patent Application Publication No. 2010/0138095 entitled "POWER SOURCE MONITORING SYSTEM FOR AGVS AND METHOD," the entire disclosures of which are herein incorporated by reference.

At least one of the plurality of AGVs 106 can include a drive assembly 108, a power source 110, and an on-board controller 112. Typically, the AGV 106 includes a memory generally indicated at reference identifier 114 in communication with the controller 112, wherein the memory 114 can include at least one executable software routine 116, such that the controller 112 executes the executable software routine 116 to accurately position the AGV 106 proximate a positioning location, as described in greater detail herein.

Figure 2:
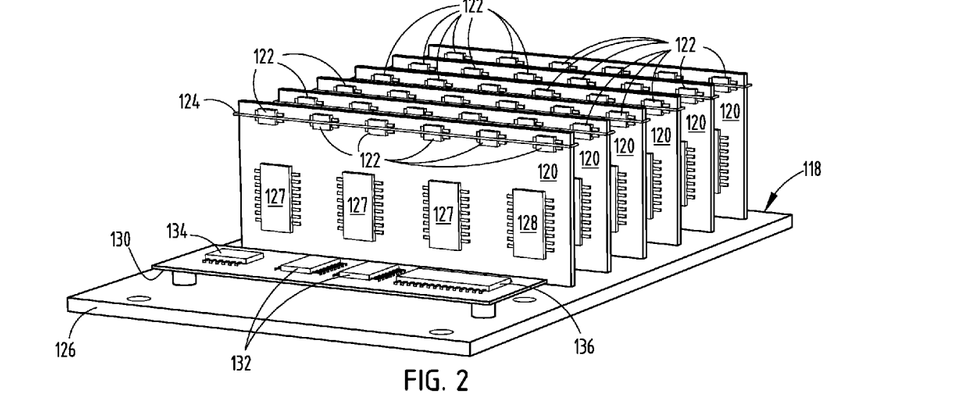
FIG. 2 is a perspective view of a sensor system, in accordance with an embodiment of the present invention.

With respect to FIGS. 1-2, the AGV 106 can further include a sensor system generally indicated at reference identifier 118 configured to determine guidance information, wherein the sensor system 118 can include a circuit board 120, a plurality of giant magneto resistive (GMR) sensors 122, typically arranged in a two-dimensional array, and at least one electromagnetic coil 124. Typically, the two-dimensional array of GMR sensors 122 can be along a surface of the circuit board 120, and the GMR sensors 122 can be configured to detect at least one of the plurality of magnets 104 when the GMR sensors 122 are proximate thereto. The electromagnetic coil 124 can extend around the circuit board 120 and at least a portion of the GMR sensors 122, wherein the electromagnetic coil 124 can be configured to polarize the residual magnetic field in the GMR sensors 122.

The controller 112 can be in communication with the sensor system 118, wherein the controller 112 can be configured to control the drive assembly 108 as a function of, or based upon, the determined guidance information. Typically, the controller controls the drive assembly 108 to stop and position the AGV 106 within approximately one eighth (⅛) of an inch or less (3.17 mm) of one of the positioning points (e.g., the magnet 104). However, it should be appreciated by those skilled in the art that the controller can be configured to control the drive assembly 108 to stop and position the AGV within other suitable distances of the positioning point that may be greater than or less than one eighth (⅛) of an inch.

In accordance with one exemplary embodiment, in operation, the sensor system 118 can be configured to detect the magnetic field of the magnet 104, such that the guidance information can be determined as the AGV 100 moves along the predetermined path. Thus, the controller 112 can then accurately determine the position of the AGV 100 with respect to the positioning point (e.g., the magnet 104 so that the AGV 100 is accurately located at a desired location along the predetermined path).

For purposes of explanation and not limitation, the sensor system 118 can be configured to substantially accurately measure static and/or dynamic properties of a magnetic field in the sensor system's 118 proximate region of sensitivity. Such measurements can then be used to control the AGV 100 to be within a tolerance of a specific location so that the cargo of the AGV is in a known position for other operations. Generally, the sensor systen 100 can be configured to measure and process three-dimensional (3-D) magnetic fields.

Thus, if the AGV 100 is being utilized as an automatic docking and final positioning applications, platform, or the like, the AGV 100 typically needs to be maneuvered to stop at a precise location. The sensor systen 100 can be configured to provide information for guiding the AGV 100 to the peak of the magnetic field of the magnet 104, which can be located near the desired positioning point. According to one embodiment, the guidance information can be provided in real-time, and include, but not limited to, a position of the magnetic field relative to a reference point on the sensor system 118, current speed of the sensor system 118, a direction of the sensor system's 118 reference point to the magnetic field, the like, or a combination thereof.

As seen in FIG. 2, according to an embodiment of the invention, the sensor system 118 can be configured to measure properties of the "z" component of the magnetic field. The z component of the magnetic field can be the component of the field coincident with the z-axis of the sensor system 118. The magnetic field can be generated in various adequate manners. According to one exemplary manner, the magnetic field can be generated by having the magnet 104 oriented approximately parallel to the sensor system's 118 z-axis near the desired final positioning point.

Figure 3:
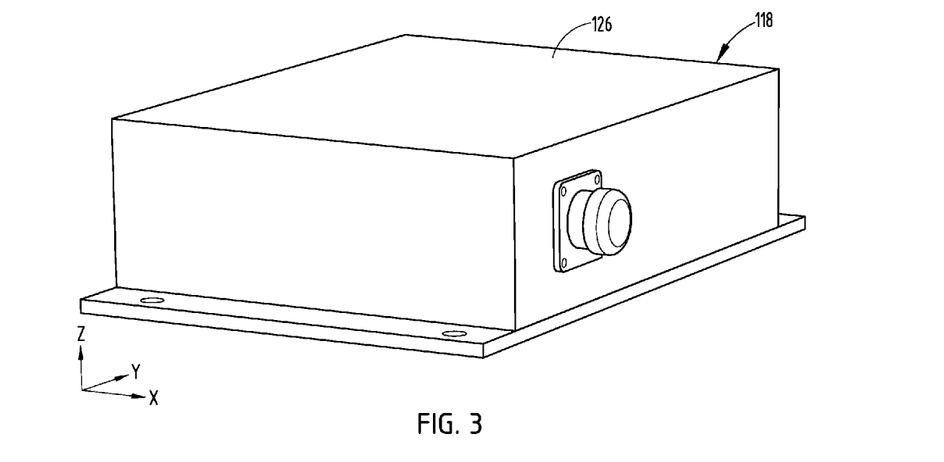
FIG. 3 is a perspective view of a sensor system, in accordance with an embodiment of the present invention.

FIG. 3 is a perspective view illustrating a sensor system, in accordance with an embodiment of the present invention. As seen in FIGS. 2 and 3, the circuit board 120 can be at least partially enclosed in a housing 126. The housing 126 can be adapted to protect the components of the sensor system 118; however, the housing 126 can be made of material(s) that minimally interfere with the magnetic field. Typically, the sensor system 118 can include a plurality of circuit boards 120, each containing a row of GMR sensors 122 spread along a top edge of the circuit board 120, hysteresis control circuitry 127, and processing circuitry 128. The sensor system 118 can further include a processor circuit board 130 that contains one or more processors 132, analog to digital (A/D) circuitry 134, power conditioning circuitry 136, interface electronics 138, the like, or a combination thereof.

Figure 4:
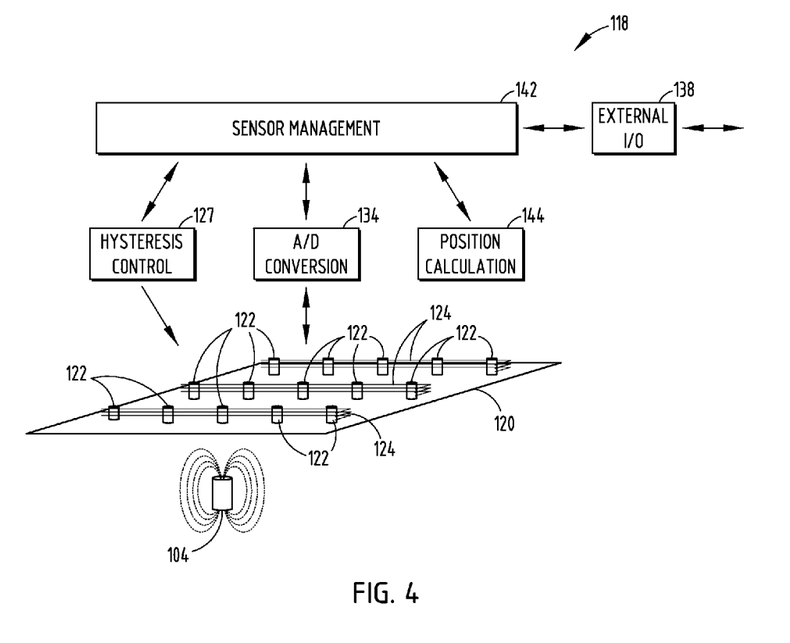
FIG. 4 is a block diagram of a sensor system, in accordance with an embodiment of the present invention.

FIG. 4 is a block diagram of a sensor system, in accordance with an embodiment of the present invention where the sensor system 118 can include the two-dimensional (2D) array. The 2D array can include the circuit board 120, the GMR sensors 122, the electromagnetic coil 124, the like, or a combination thereof. The sensor system 118 can further include the hysteresis control circuitry 127, the A/D circuitry 134, and the interface electronics 138 (e.g., external I/O). Additionally, the sensory system 118 can include a sensor management device 142 and a position calculation device 144.

Typically, the polarizing of the GMR sensor 122 can be accomplished by passing an electrical current through the electromagnetic coil 124 in approximately two microsecond (2 μs) pulses. Whether the electromagnetic coil 124 and/or the hysteresis control circuitry 127 is utilized for polarizing the GMR sensors, the polarizing is typically done since the GMR sensors 122 have a characteristic wherein if a magnetic field is applied in one direction and then taken away, the GMR sensors 122 can have a residual magnetism in it, and if a magnetic field is applied in the other direction, there can be a hysteresis effect, which can be a source of error. According to one embodiment, the two-dimensional array of GMR sensors 122 is a 6×6 array. Additionally or alternatively, the GMR sensors 124 can be spaced approximately 1.3 inches (33.02 mm) apart from one another.

Figure 5:
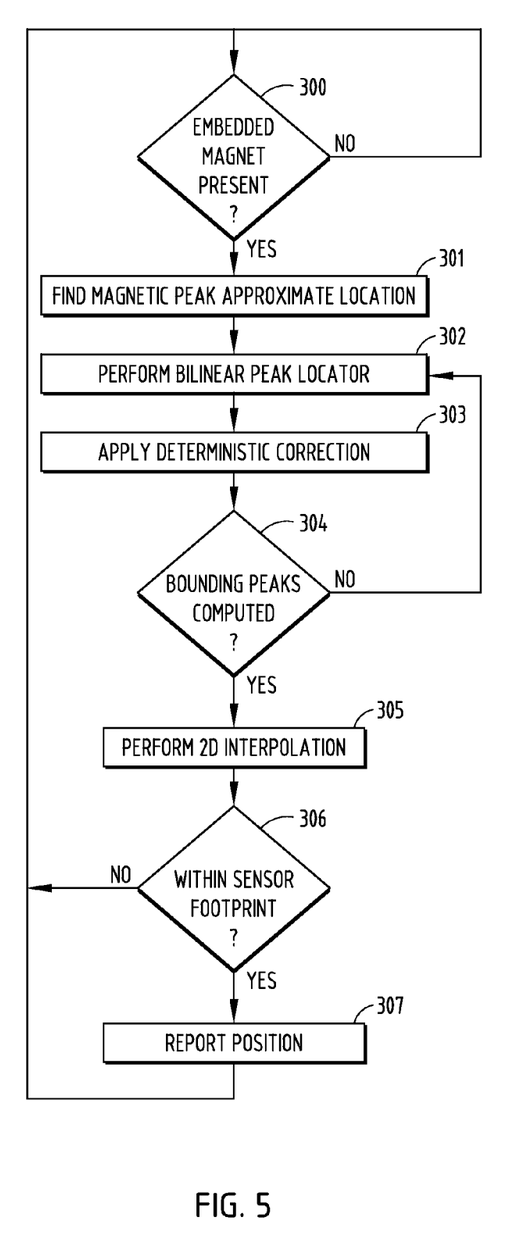
FIG. 5 is a flow chart illustrating a method of locating a peak of a magnetic field, in accordance with an embodiment of the invention.

FIG. 5 is a flow chart illustrating a method of locating a peak of a magnetic field, in accordance with an embodiment of the invention. According to an exemplary embodiment of the invention, the detection of the peak of the magnetic field for controlling the AGV can be a two-dimensional (2D) interpolated bilinear peak locator algorithm which offers the advantage of high accuracy while eliminating spatial discontinuities from the computed peak location. A spatial discontinuity in the computed peak location is a sudden jump in the reported position not consistent with the motion of the AGV and is a result of system noise or errors in the GMR sensor 122 characteristics including, but not limited to, errors in dynamic bias and scale factor. Spatial continuity is advantageous to both positioning applications and, guidance applications requiring velocity and direction information provided by the sensor system 118. The 2D interpolated bilinear peak locator algorithm operates as a sequence of computations. Initially, the presence of the embedded magnet is detected 300 and the magnet peak's approximate location point is determined 301. Thereafter, four bilinear peak locating computations are performed which identify the bounds of the approximate location point 302. A pre-computed deterministic correction is applied 303 and two-dimensional (2D) interpolation is performed 305 if the bounding peaks are computed 304. If the bounding peaks are not computed, then the process begins again where a bilinear peak is located 302. After the 2D interpolation is performed 305, then if the interpolation is not within the sensor footprint 306, then the process beings again 300; however, if within the sensor footprint then the position is reported 307 where the process begins again 300. The presence of one or more of the plurality of embedded magnets 104 is detected 300 by summing the residual response of all GMR sensors 122 as described in the 2D interpolated bilinear peak locater process 300 and comparing the summation of the residuals with a predetermined threshold. The residual response of a particular GMR sensor can be the raw sensor response with dynamic bias removed and a predetermined scale factor applied.

Figure 7:
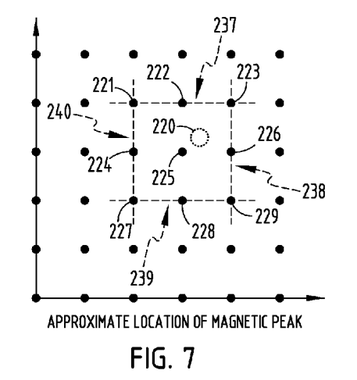
FIG. 7 is a graph illustrating the location of a magnetic peak relative to an array of GMR sensors, in accordance with an embodiment of the invention.

FIG. 7 is a graph illustrating the location of a magnetic peak emitted by embedded magnet 104 relative to an array of GMR sensors, in accordance with an embodiment of the invention. The magnetic peak is proximate to the sensor system and illustrated as a dashed circle 220. For purposes of explanation and not limitation, a subset of the sensor array can be nine equally spaced GMR sensors represented by points 221 through 229 inclusive. Point 225 represents the GMR sensor with the highest residual response. By comparing the residual response of GMR sensors 222, 224, 226, and 228, the quadrant relative to point 225 containing the peak magnetic field can be identified. The point 225 and the identified quadrant define the approximate location of the peak as described with FIG. 7 described herein. Thus, the location of a peak in the magnetic field along each of the four lines bounding the quadrant according to the method as described with regard to FIG. 7, is calculated using a bilinear peak locating algorithm. The four substantially linear bounding lines 237, 238, 239, 240 are the lines connecting points 221, 222, and 223; points 223, 226, and 229; points 227, 228, and 229; and points 221, 224 and 227, respectively. The solution for each of the four peaks is corrected using a pre-computed compensation table.

Figure 6:
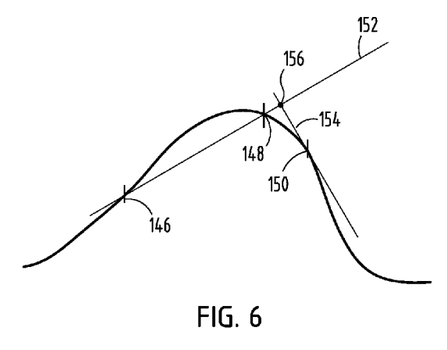
FIG. 6 is a graph illustrating detection of a peak of a magnetic field, in accordance with an embodiment of the present invention.

FIG. 6 is a drawing illustrating a method of interpolating the peak of a magnetic field, in accordance with an embodiment of the invention. For purposes of explanation and not limitation, along each of the four bounding lines 237, 238, 239, 240 there can be three (3) equally spaced GMR sensors 122, represented by points 146, 148, and 150. A substantially linear line 152 connects and extends beyond points 146 and 148. A line 154 passes through point 150 with a slope equal to the negative slope of line 152. The intersection of line 152 and 154 at point 156 can represent the peak of the magnetic field. The bilinear peak location algorithm applied to each of the four bounding lines can be represented by the following when measurements for the "peak" GMR sensor 122 and two adjacent sensors (either in the x or y direction) are determined and represented by $y_1$, $y_2$, and $y_3$, respectively, and their x positions are $-a$, $0$, and $a$, respectively:

If the peak is to the right of x=0 ($y_3 > y_1$) then the slope of line 152 (m), the slope of line 154 (−m), the y intercept of line 152 ($b_1$), the y intercept of line 154 ($b_2$), and the position of the peak can be determined by the following equations:

$$m = \frac{y_2 - y_1}{a} \quad \text{Equation 1}$$

$$b_1 = y_2 \quad \text{Equation 2}$$

$$b_2 = y_3 + m \cdot a \quad \text{Equation 3}$$

$$-m \cdot x + b_2 = m \cdot x + b_1 \quad \text{Equation 4}$$

$$x = \frac{a}{2} \cdot \frac{y_1 - y_3}{y_1 - y_2} \quad \text{Equation 5}$$

If the peak is to the left of x=0 ($y_3 > y_1$) then the slope of line 152 (m), the slope of line 154 (−m), the y intercept of line 152 ($b_1$), the y intercept of line 154 ($b_2$), and the position of the peak can be determined by the following equations:

$$m = \frac{y_3 - y_2}{a} \quad \text{Equation 6}$$

$$b_1 = y_2 \quad \text{Equation 7}$$

$$b_2 = y_3 + m \cdot a \quad \text{Equation 8}$$

$$-m \cdot x + b_2 = m \cdot x + b_1 \quad \text{Equation 9}$$

$$x = -\frac{a}{2} \cdot \frac{y_3 - y_1}{y_3 - y_2} \quad \text{Equation 10}$$

The accuracy of peak location as computed by the bilinear peak locator can be improved by adjustment according to predetermined corrections. The predetermined corrections can be derived by computing the theoretical shape of the magnetic field along a bounding line, applying the bilinear peak locator algorithm to the synthesized magnetic field and develop a compensation curve that corrects for errors in the bilinear peak locator. The specific curves are highly dependent upon the GMR sensor spacing, distance of the sensor system from the embedded magnets, and the specific characteristics of the embedded magnets. According to an embodiment, the bilinear peak locator algorithm can be used to control the AGV 100 to be within approximately four hundredths (0.04) of an inch or less of the magnet 104. However, it should be appreciated by those skilled in the art that the linear peak locator algorithm can be used to control the AGV 100 to be within other suitable distances of the magnet 104 that are greater than or less than four hundredths (0.04) of an inch.

Figure 8:
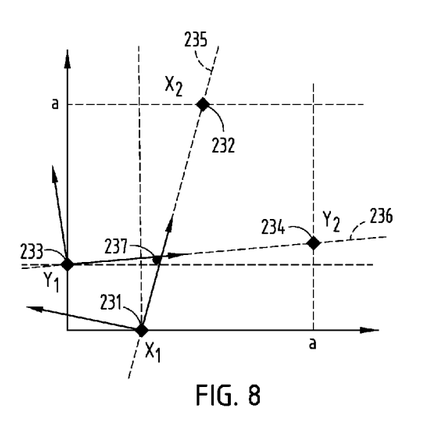
FIG. 8 is a drawing illustrating a method of interpolating the peak of a magnetic field, in accordance with an embodiment of the invention.

For purposes of explanation and not limitation, the geometry for 2D interpolation, Step 304, is shown in FIG. 8. As seen in FIG. 8, the diamond shaped points 231, 232, 233, and 234 with coordinates $(x_1, 0)$, $(x_2, a)$, $(0, y_1)$, and $(a, y_2)$ respectively represent the four compensated bilinear peak locations computed in steps 302 and 303. The intersection of line 235 connecting points 231 and 232, with line 236 connecting points 233 and 234 is the 2D bilinear interpolated solution at point 237. Due to the fundamental characteristics of the bilinear peak finder this solution is guaranteed to be spatially continuous which is advantageous to both positioning applications and, guidance applications requiring velocity and direction information provided by the sensor system 118. The coordinates (x, y) of point 237 is found using the following equations:

$$\delta_y = y_2 - y_1 \quad \text{Equation 11}$$

$$\delta_x = x_2 - x_1 \quad \text{Equation 12}$$

$$n_x = \frac{-\delta_y \hat{x} + a\hat{y}}{\sqrt{a^2 + \delta_y^2}} \quad \text{Equation 13}$$

($n_x$ = unit vector normal to line 236)

$$n_y = \frac{-a\hat{x} + \delta_x \hat{y}}{\sqrt{a^2 + \delta_x^2}} \quad \text{Equation 14}$$

($n_y$ = unit vector normal to line 235)

$$r \cdot n_x = n_x \cdot (0, y_1) \quad \text{Equation 15}$$

(vector equation for line 236)

$$r \cdot n_y = n_y \cdot (x_1, 0) \quad \text{Equation 16}$$

(vector equation for line 235)

$$\frac{-\delta_y x + ay}{\sqrt{a^2 + \delta_y^2}} = \frac{ay_1}{\sqrt{a^2 + \delta_y^2}} \quad \text{Equation 17}$$

(perform dot products in Equation 15)

$$\frac{-ax + \delta_x y}{\sqrt{a^2 + \delta_x^2}} = \frac{-ax_1}{\sqrt{a^2 + \delta_x^2}} \quad \text{Equation 18}$$

(perform dot products in Equation 16)

$$\begin{bmatrix} -\delta_y & a \\ -a & \delta_x \end{bmatrix} \begin{bmatrix} x \\ y \end{bmatrix} = \begin{bmatrix} ay_1 \\ -ax_1 \end{bmatrix} \quad \text{Equation 19}$$

(Equations 17 and 18 in matrix notation)

$$x = x_1 + \frac{y_1(x_2 - x_1)}{a} \quad \text{Equation 20}$$

(solving Equation 19 for x)

$$y = y_1 + \frac{x_1(y_2 - y_1)}{a} \quad \text{Equation 21}$$

(solving Equation 19 for y)

Speed and ground track angle i.e. direction of the AGV 100 is useful guidance information 210 for controlling 214 the AGV. Advantageously, the sensor system 118 can determine both speed and ground track angle from successive measurements of the relative location of one of the plurality of embedded magnets within the sensor system 118 footprint. In accordance with an embodiment of the present invention, successive measurements made at times $t_1$ and $t_2$ respectively can be separated by 10 ms. For purposes of explanation and not limitation, the sensor speed and ground track angle can be determined by the following equations:

$$x(t_1) = x \text{ position at time } t_1 \quad \text{Equation 22}$$

$$x(t_2) = x \text{ position at time } t_2 \quad \text{Equation 23}$$

$$y(t_1) = y \text{ position at time } t_1 \quad \text{Equation 24}$$

$$y(t_2) = y \text{ position at time } t_2 \quad \text{Equation 25}$$

$$\text{Speed along sensor } x \text{ axis} = \frac{x(t_2) - x(t_1)}{t_2 - t_1} \quad \text{Equation 26}$$

$$\text{Speed along sensor } y \text{ axis} = \frac{y(t_2) - y(t_1)}{t_2 - t_1} \quad \text{Equation 27}$$

$$\text{Sensor ground track angle} = \tan^{-1}\left(\frac{\text{Speed along sensor } y \text{ axis}}{\text{Speed along sensor } x \text{ axis}}\right) \quad \text{Equation 28}$$

Alternatively, a "center of gravity" CG Peak Locator can be used to locate a peak in the magnetic field. The GMR sensors 122 are arranged in an M by N (M×N) array separated by 'a' inches. For purposes of explanation and not limitation, this can be a 6 by 6 array of GMR sensors spaced 1.3 inches apart. The CG Peak Locator is advantageously a computationally simple algorithm that produces spatially continuous solutions everywhere. The CG Peak Locator is also highly accurate near the center of the sensor subsystem. As shown in Equation 29 the residual response, denoted as, $R_{i,j}$ of a particular GMR sensor 122 in the array of GMR sensors can be computed by subtracting the sensor's current bias, $B_{i,j}$ from the raw output of GMR sensor, $G_{i,j}$ and multiplying the result by a predetermined scalefactor, $S_{i,j}$. The location of the magnetic peak (x,y) within the array of GMR sensors can be found using the CG Peak Locator according to the Equations 30 and 31:

$$R_{i,j} = (G_{i,j} - B_{i,j}) \cdot S_{i,j} \text{ where } i = 1, 2, \ldots M; j = 1, 2, \ldots N \quad \text{Equation 29}$$

$$x = a \cdot \frac{\sum_{i=1}^{M}\left[\left(i - \frac{M+1}{2}\right) \cdot \sum_{j=1}^{N} R_{i,j}\right]}{\sum_{i=1}^{M} \sum_{j=1}^{N} R_{i,j}} \quad \text{Equation 30}$$

-continued $$y = a \cdot \frac{\sum_{j=1}^{N}\left[\left(j - \frac{N+1}{2}\right) \cdot \sum_{i=1}^{M} R_{i,j}\right]}{\sum_{i=1}^{M}\sum_{j=1}^{N} R_{i,j}}$$

Equation 31

According to still another embodiment of the invention, two embedded magnets can be separated such that they fit within the sensor system's footprint and can be aligned to a known compass heading, Ψ. The resulting two peaks in the magnetic field can be located using multiple application of a peak locator algorithm. The resulting locations can be used to establish the AGV heading according to the following equations:

$x_1 = x$ position of peak number 1  Equation 32

$x_2 = x$ position of peak number 2  Equation 33

$y_1 = y$ position of peak number 1  Equation 34

$y_2 = y$ position of peak number 2  Equation 35 sensor ground track angle, $\Gamma = \tan^{-1}\left(\frac{y_2 - y_1}{x_2 - x_1}\right)$  Equation 36

AGV heading, $\psi = \Psi - \Gamma$  Equation 37

According to yet another embodiment of the invention, two or more embedded magnets can be arranged according to a plurality of unique predetermined patterns such that each of the unique predetermined patterns fits within the sensor system's footprint. Each of the unique predetermined patterns of magnets can be placed at specific known locations along the AGV predetermined paths. The resulting peaks in the magnetic field produced by the predetermined pattern of magnets can be located using multiple applications of a peak locater algorithm and the unique pattern identified. Advantageously, this is a simple method for locating the AGV initial position.

Figure 9:
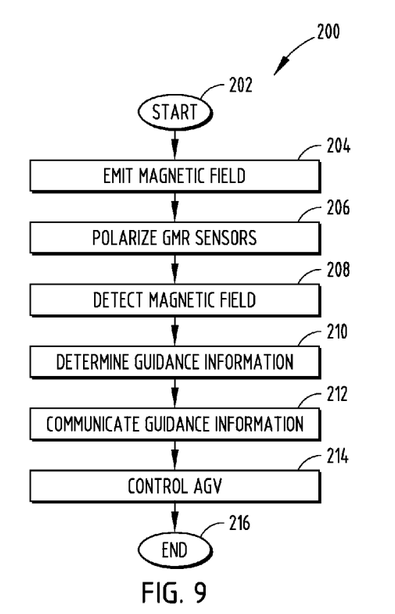
FIG. 9 is a flow chart illustrating a method of positioning an AGV proximate a position location, in accordance with an embodiment the present invention.

Finally, FIG. 9 is a flow chart illustrating a method of positioning an AGV proximate a position location, in accordance with an embodiment of the present invention and is described with regard to the previous illustrations, where a method of positioning the AGV 100 having the drive assembly 108 approximate a positioning point that includes the embedded magnet 104 is generally at reference identifier 200. The method 200 starts at step 202, and proceeds to step 204, wherein the magnetic field is emitted by the embedded magnet 102. In step 206 the GMR sensors 122 are polarized. Typically, polarizing of the GMR sensors 122 can be done by passing an electrical current through the electromagnetic coil 124 in two millisecond (2 ms) pulses. At step 208, it is determined if a magnetic field is detected. At step 210, the guidance information is determined based upon the magnetic detection of the magnetic field, and at step 212, the guidance information is communicated. At step 214 the AGV 100 is controlled based upon the guidance information, and the method 200 ends at step 216.

Advantageously, the AGV 100, sensor system 118, and method 200 allow for the AGV 100 to be placed within a tolerance of the positioning location, so that an object being transported by the AGV 100 is known within a specific tolerance. It should be appreciated by those skilled in the art that additional or alternative advantages may be present from the AGV 100, sensor system 118, and the method 200. It should further be appreciated by those skilled in the art that the components and method steps described above can be combined in additional or alternative ways not explicitly described herein.

It is to be understood that variations and modifications can be made on the aforementioned structure without departing from the concepts of the present invention, and further it is to be understood that such concepts are intended to be covered by the following claims unless these claims by their language expressly state otherwise.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

We claim:

1. An automatic guided vehicle (AGV) system for automatically transporting loads over a ground surface along a predetermined path, the improvement comprising:
    a plurality of embedded magnets fixed to the ground surface and spaced along the predetermined path distant from one another, wherein a single magnet of the plurality of magnets represent a positioning point; and
    an AGV comprising:
        a drive assembly for moving the AGV relative to the ground surface;
        a sensor system configured to determine guidance information, the sensor system comprising:
            a series of circuit boards;
            a plurality of giant magneto resistive (GMR) sensors disposed linearly along a surface of each circuit board of the series of circuit boards to define a two-dimensional array of GMR sensors spaced in a grid configuration in a plane generally parallel to the ground surface, wherein the plurality of GMR sensors is configured to detect a coordinate position of the single magnet within a boundary perpendicular to the plane and defined by a periphery of the two-dimensional array of GMR sensors, such that a first 3×3 sub-array of the two-dimensional array of GMR sensors is utilized most proximate the embedded magnet to determine the coordinate position at a first moment in time, and upon movement of the AGV relative to the ground surface, a second 3×3 sub-array of the two-dimensional array of GMR sensors is utilized most proximate the embedded magnet to determine the coordinate position at a second moment in time, and wherein the coordinate position is computed between the first and second moments in time without spatial discontinuities between the first and second 3×3 sub-array using two dimensional interpolated bilinear peak detection; and
            an electromagnetic coil coupled with at least one of the plurality of GMR sensors to reduce hysteresis thereof; and
        a controller in communication with the sensor system, wherein the controller is configured to control the drive assembly based upon the guidance information determined from the detected coordinate position, such that the controller controls the drive assembly to stop the AGV within at least one-eighth (⅛) of an inch of the positioning point.

2. The AGV system of claim 1, wherein the controller is configured to control the drive assembly to maintain the AGV within at least one (1) inch of the predetermined path.

3. The AGV system of claim 1, wherein the plurality of GMR sensors of the sensor system determines the coordinate position based on a location of a peak in a magnetic field of the single magnet.

4. The AGV system of claim 1, wherein the guidance information comprises at least one of:
- a reference location of the AGV relative to the detected coordinate position of the single magnet;
- a speed of the AGV relative to the single magnet; and
- a direction of movement of the AGV relative to the single magnet.

5. The AGV system of claim 1, wherein the guidance information is determined in real-time.

6. The AGV system of claim 1, wherein the two-dimensional array of GMR sensors is a 6×6 array.

7. The AGV system of claim 1, wherein each of the plurality of GMR sensors are spaced at least 1.3 inches apart from each other.

8. The AGV system of claim 1, wherein the sensor system comprises an electrical current passing through the electromagnetic coil in two microsecond (2 μs) pulses for reducing hysteresis in the at least one of the plurality of GMR sensors.

9. The AGV system of claim 1, wherein the sensor system computes a location of a peak in a magnetic field of the single magnet.

10. The AGV system of claim 9, wherein the sensor system also computes continuous velocity and direction measurements based upon the spatially continuous positioning of the AGV.

11. A sensor system configured to determine guidance information for positioning an automatic guided vehicle (AGV) within on eighth (⅛) inch of a positioning point that comprises an embedded magnet, the sensor system comprising:
- a circuit board;
- a plurality of giant magneto resistive (GMR) sensors disposed in aligned rows along a surface of the circuit board to define a two-dimensional array of GMR sensors spaced in a grid configuration in a generally horizontal plane, wherein the plurality of GMR sensors is configured to locate a coordinate position of the embedded magnet within a boundary perpendicular to the generally horizontal plane and defined by a periphery of the two-dimensional array of GMR sensors for calculating guidance information, such that a first 3×3 sub-array of the two-dimensional array of GMR sensors is utilized most proximate the embedded magnet to determine the coordinate position at a first moment in time, and upon movement of the AGV relative to the ground surface, a second 3×3 sub-array of the two-dimensional array of GMR sensors is utilized most proximate the embedded magnet to determine the coordinate position at a second moment in time, and wherein the coordinate position is computed between the first and second moments in time without spatial discontinuities between the first and second 3×3 sub-arrays using two-dimensional interpolated bilinear peak detection; and
- an electromagnetic coil coupled with at least one of the plurality of GMR sensors, the electromagnetic coil configured to reduce hysteresis of the at least one of the plurality of GMR sensors.

12. The sensor system of claim 11, wherein the circuit board includes a series of vertical boards, and wherein each row of the plurality of GMR sensors is disposed on a vertical board of the series of vertical boards to define the two-dimensional array of GMR sensors.

13. The sensor system of claim 11, wherein the plurality of GMR sensors is further configured to determine the coordinate position based on a peak of a magnetic field of the embedded magnet within the boundary perpendicular to the plane and defined by the periphery of the two-dimensional array of GMR sensors.

14. The sensor system of claim 13, wherein the guidance information includes a reference location of the sensor system relative to the detected coordinate position of the embedded magnet based on a location of a peak in a magnetic field of the embedded magnet.

15. The sensor system of claim 11, wherein the guidance information is determined in real-time.

16. The sensor system of claim 11, wherein the two-dimensional array of GMR sensors is a 6×6 array.

17. The sensor system of claim 11, wherein the GMR sensors are spaced 1.3 inches apart.

18. The sensor system of claim 11, wherein an electrical current passes through the electromagnetic coil in two microsecond (2 μs) pulses for reducing hysteresis of the at least one of the plurality of GMR sensors.

19. The sensor system of claim 11, wherein the sensor system also computes continuous velocity and direction measurements based upon the spatially continuous positioning of the AGV.

20. A method of positioning an automatic guided vehicle (AGV) having a drive assembly proximate a positioning point that comprises an embedded magnet, the method comprising the steps of:
- providing a plurality of GMR sensors disposed in a generally horizontal plane and spaced in a grid configured to define a two-dimensional array;
- detecting a peak in a magnetic field of the embedded magnet by the plurality of GMR sensors;
- determining, by a controller, guidance information including a coordinate position of the embedded magnet within a boundary perpendicular to the generally horizontal plane and defined by a periphery of the two-dimensional array based upon the peak, such that a first 3×3 sub-array of the two-dimensional array of the plurality of GMR sensors is utilized most proximate the embedded magnet to determine the coordinate position at a first moment in time, and upon movement of the AGV relative to the ground surface, a second 3×3 sub-array of the two-dimensional array of the plurality of GMR sensors is utilized most proximate the embedded magnet to determine the coordinate position at a second moment in time, and wherein the coordinate position is computed between the first and second moments in time without spatial discontinuities between the first and second 3×3 sub-arrays using two-dimensional interpolated bilinear peak detection; and
- communicating the guidance information to control the drive assembly to position the AGV within one eighth (⅛) of an inch of the positioning point.

21. The method of claim 20, wherein the step of determining the guidance information further comprises computing speed and direction of movement of the AGV relative to the embedded magnet.

22. The method of claim 20, wherein the step of determining the guidance information further comprises determining a location of a peak in a magnetic field of the embedded magnet for determining the coordinate position.

23. The method of claim 20, wherein the step of determining the guidance information comprises at least one of:
   determining a speed of the GMR sensors; and
   determining a direction of movement of the GMR sensors relative to the embedded magnet.

24. The method of claim 20, further comprising the step of:
   enabling spatially continuous positioning of the AGV based on continuous velocity and direction measurements.

\* \* \* \* \*